United States Patent [19]
Oles et al.

[11] Patent Number: 6,161,990
[45] Date of Patent: Dec. 19, 2000

[54] CUTTING INSERT WITH IMPROVED FLANK SURFACE ROUGHNESS AND METHOD OF MAKING THE SAME

[75] Inventors: Edward J. Oles, Ligonier; Lee E. Thomas, Latrobe, both of Pa.

[73] Assignee: Kennametal Inc., Latrobe, Pa.

[21] Appl. No.: 09/190,075

[22] Filed: Nov. 12, 1998

[51] Int. Cl.[7] .................................................. B23B 27/14
[52] U.S. Cl. ......................... 407/119; 407/118; 407/113
[58] Field of Search .................................. 407/119, 118, 407/113; 408/144, 145; 29/411, 412, 414, 417; 51/293

[56] References Cited

U.S. PATENT DOCUMENTS

| | | | |
|---|---|---|---|
| 4,854,784 | 8/1989 | Murray et al. | 407/119 X |
| 5,139,372 | 8/1992 | Tanabe et al. | 407/118 |
| 5,178,645 | 1/1993 | Nakamura et al. | 51/293 |
| 5,352,067 | 10/1994 | Arail et al. | 407/119 X |
| 5,370,944 | 12/1994 | Omori et al. | 428/565 |
| 5,447,208 | 9/1995 | Lund et al. | 175/428 |
| 5,584,045 | 12/1996 | Tanabe et al. | 407/119 X |
| 5,585,176 | 12/1996 | Grab et al. | 428/336 |
| 5,653,300 | 8/1997 | Lund et al. | 175/428 |
| 5,709,907 | 1/1998 | Battaglia et al. | 427/126.1 |
| 5,722,803 | 3/1998 | Battaglia et al. | 407/119 |
| 5,813,105 | 9/1998 | Littecke et al. | 07/118 X |
| 5,967,250 | 10/1999 | Lund et al. | 175/428 |

FOREIGN PATENT DOCUMENTS 0480394  4/1992  European Pat. Off. .

OTHER PUBLICATIONS

Gaser, "Edge and Surface Honing on Various Shaped PCD & CBN Inserts", SME Technical Paper MR92–357 (1992).
Kennametal brochure entitled "KCD25 Diamond Film Coated Carbide Inserts", (1994).
Notification of Transmittal of the International Search Report, International Patent Application No. PCT/US99/24269 (dated Feb. 22, 2000).
International Search Report, International Patent Application No. PCT/US99/24269 (dated Feb. 22, 2000).

*Primary Examiner*—Henry W. H. Tsai
*Attorney, Agent, or Firm*—John J. Prizzi

[57] ABSTRACT

A cutting insert having a rake surface and a flank surface wherein there is a cutting edge at the intersection of the rake surface and the flank surface. The rake surface exhibits a sufficient degree of surface roughness so as to provide for microscopic chip control. The flank surface exhibits a sufficiently smooth (i.e., a mirror finish) so as to provide for a workpiece surface finish that approaches (or possibly reaches) the theoretical value attributable for the given cutting conditions.

23 Claims, 3 Drawing Sheets

CUTTING INSERT WITH IMPROVED FLANK SURFACE ROUGHNESS AND METHOD OF MAKING THE SAME

BACKGROUND OF THE INVENTION

The invention pertains to a cutting insert, and in particular, to a polycrystalline diamond (PCD) cutting insert, as well as to a diamond-coated cutting insert that has an improved flank surface roughness.

In the manufacture of a polycrystalline diamond cutting insert, the PCD blank is brazed into a pocket which has been ground into the carbide substrate so as to form a PCD cutting insert. The periphery (i.e., the flank surfaces) of the PCD cutting insert is then finish-ground to the specified dimensions for a particular style of cutting insert. This grinding operation is performed in a direction which is normal (i.e., perpendicular) to the cutting edge of the PCD cutting insert. Generally speaking it is easier to grind the periphery in a direction normal to the cutting edge since the grinding proceeds from the carbide into the diamond. The flank surfaces of the PCD blank which contain the grind lines perpendicular to the cutting edge create serrations (which are typically microscopic) along the cutting edge. These serrations adversely affect the surface finish of the workpiece produced by the PCD cutting insert. Because the lay of the grind lines is normal to the cutting edge, it is very difficult to polish out these serrations to achieve a flank surface with a mirror finish (i.e., less than 5 microinches, $R_a$) In the absence of a flank surface with a; mirror finish the PCD cutting insert cannot produce an optimum workpiece surface finish wherein the workpiece surface finish approaches (or even attains) the theoretical value.

It thus becomes apparent that it would be highly desirable to provide a PCD cutting insert which has a flank surface with a mirror finish of less than 5 microinches, $R_a$. It would also be very desirable to provide a PCD cutting insert which produces a workpiece with a surface finish that approaches (or possibly reaches) the theoretical value for the workpiece surface finish.

At the present time there is a diamond coated cutting insert which presents a rake surface which has a predetermined surface roughness. U.S. Pat. No. 5,585,176 to Grab et al. for DIAMOND COATED TOOLS AND WEAR PARTS (which is hereby incorporated by reference herein), as well as U.S. Pat. No. 5,648,119 to Grab et al. for PROCESS FOR MAKING DIAMOND COATED TOOLS AND WEAR PARTS (which is hereby incorporated by reference herein), describes such a diamond coated cutting insert and the process to make such a cutting insert. In addition, U.S. Pat. No. 5,709,907 to Battaglia et al. for a METHOD OF MAKING COATED CUTTING TOOLS (which is hereby incorporated by reference herein) and U.S. Pat. No. 5,722,803 to Battaglia et al. for a CUTTING TOOL AND METHOD OF MAKING THE CUTTING TOOL (which is hereby incorporated by reference herein) each describe a diamond coated cutting insert with a substrate having a roughened rake surface so as to provide for microscopic chip control. By having a substrate rake surface with this surface roughness, the diamond coated cutting inserts provide for a certain degree of chip control so that long coils of metal do not form, but instead, shorter chips form during a metal removal operation due to the presence of the surface roughness on the rake surface. Disadvantages associated with the formation of long coils of metal (i.e., "birds nests") during the cutting operation are set forth in U.S. Pat. No. 5,709,907 and U.S. Pat. No. 5,722,803.

By providing a PCD cutting insert wherein the rake surface of the PCD blank has a surface roughness of a magnitude like those set forth in U.S. Pat. No. 5,585,176 to Grab et al., U.S. Pat. No. 5,648,119 to Grab et al., U.S. Pat. No. 5,709,907 and U.S. Pat. No. 5,722,803, the PCD cutting insert would provide for microscopic chip control. It is therefore apparent that it would be desirable to provide a PCD cutting insert wherein the PCD blank presents a rake surface with a surface roughness that provides for microscopic chip control and a flank surface that has a mirror finish (less than 5 microinches, $R_a$). Such a PCD cutting insert would provide for optimum chip control as well as provide a workpiece surface finish that approaches (or possibly attains) the theoretical value.

Referring to a diamond coated cutting insert, it would also be highly desirable to provide a diamond coated cutting insert which has a roughened rake surface and a flank surface with a mirror finish (less than five microinches, Ra). Such a diamond coated cutting insert would provide for optimum chip control as well as provide a workpiece surface finish that approaches (or possibly attains) the theoretical value.

SUMMARY

In one form thereof, the invention is a polycrystalline diamond cutting insert. The insert comprises a substrate which contains a pocket, and a polycrystalline diamond blank which is affixed in the pocket. The polycrystalline blank includes a rake surface and a flank surface wherein the rake surface and the flank surface intersect to form a cutting edge. The flank surface presents finish-grind lines lying in a direction generally parallel to the direction of the cutting edge.

In another form thereof, the invention is a polycrystalline blank for use in conjunction with a substrate. The blank comprises a rake surface and a flank surface wherein the rake surface and the flank surface intersect to form a cutting edge. The flank surface presents finish-grind lines lying in a direction generally parallel to the direction of the cutting edge.

In still another form thereof, the invention is a diamond coated cutting insert. The cutting insert comprises a rake surface which has a surface roughness of greater than about 15 microinches, $R_a$, and a flank surface wherein there is a cutting edge at the intersection of the rake surface and the flank surface. The flank surface has a surface roughness of less than five microinches, $R_a$.

In another form thereof, the invention is a method of making a PCD cutting insert comprising the steps of: providing a substrate containing a pocket; providing a PCD blank having a diamond layer and a backing layer wherein the diamond layer has a rake surface and a flank surface which intersect to form a cutting edge; affixing the PCD blank in the pocket of the substrate; and finish-grinding the flank surface of the diamond layer so that the finish-grind lines are generally parallel to the cutting edge whereby there are substantially no serrations in the cutting edge.

In still another form thereof the invention is a method making a diamond coated cutting tool comprising the steps of: providing a substrate having a rake surface having a surface roughness of greater than 15 microinches, $R_a$, and a flank surface wherein the rake surface and the flank surface intersect to form a cutting edge; coating the substrate with a diamond layer so that the diamond layer is on at least the rake surface and the flank surface; and polishing the diamond layer on the flank surface so that the diamond layer on the flank surface has a surface roughness of less than five microinches, $R_a$.

BRIEF DESCRIPTION OF THE DRAWINGS

The following is a brief description of the drawings which form a part of this patent application.

DETAILED DESCRIPTION

Figure 1:
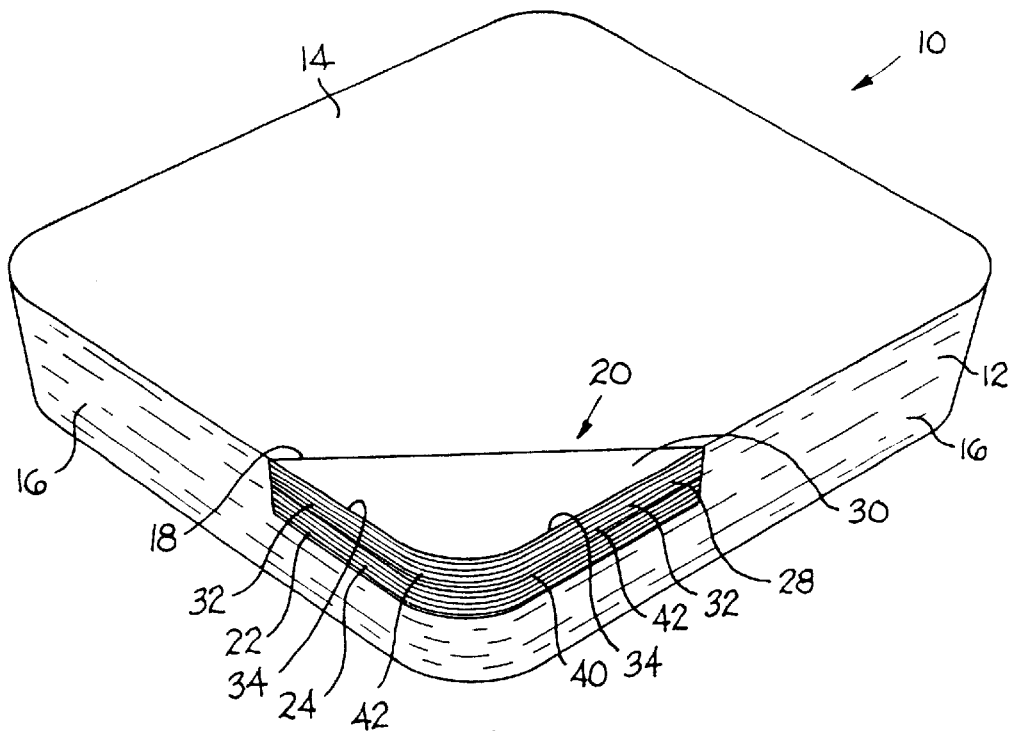
FIG. 1 is an isometric view of a specific embodiment of a PCD cutting insert wherein the flank surfaces of the PCD blank have been finish ground in a direction generally parallel to the cutting edges of the PCD cutting insert with the finish-grind lines being exaggerated to show the direction in which they lay.

Referring to the drawings, and in particular to FIG. 1, there is shown a PCD polycrystalline diamond (PCD) cutting insert generally designated as 10. The PCD cutting insert 10 includes a substrate 12 which preferably is a tungsten carbide-cobalt material; however, applicants contemplate that other cemented carbides or materials may be suitable for use as the substrate provided that such material is compatible with the other components of the PCD cutting insert and the applications to which the cutting insert is put. Substrate 12 presents a rake surface 14 and flank surfaces 16. Substrate 12 further contains a generally triangularly-shaped pocket 18 which receives a generally triangularly-shaped polycrystalline diamond (PCD) blank 20. Even though the pocket 18 and the PCD blank 20 are of a generally triangular shape, it should be appreciated that the pocket 18 in the substrate 12 and the PCD blank 20 may take any one of a number of other geometries or configurations so that the invention is not intended to be limited to a triangularly-shaped pocket and PCD blank.

The PCD blank 20 comprises a backing layer 22 which typically is made from a tungsten carbide-cobalt material. The backing layer 22 has flank surfaces 24 and a top (or rake) surface (not illustrated). The PCD blank 20 further includes a diamond layer 28 which is on the top surface of the backing layer 22. The diamond layer 28 presents a rake surface 30 and flank surfaces 32 which intersect to form cutting edges 34. A typical thickness of the diamond layer 28 is 500 micrometers and a typical thickness of the backing layer 22 is 500 micrometers.

The PCD blank 20 is affixed in the pocket 18 of the substrate 12 by brazing wherein the braze joint 40 is between the surfaces of the substrate 12 which defines the pocket 18 and the adjacent surfaces of the backing layer 22. The backing layer 22 and the substrate 12 are made from materials that are compatible so as to be able to be joined together by brazing. In the case where the backing layer 22 is a tungsten carbide-cobalt material and the substrate 12 is tungsten carbide-cobalt material, a typical braze alloy comprises primarily silver alloy with copper, zinc, cadmium, and nickel. The braze alloy has a solidification range of 630° C. to 690° C.

FIG. 1 illustrates the presence of finish-grind lines 42 which exist in the flank surfaces 32 of the diamond layer 28 and in the flank surfaces 24 of the backing layer 22. These finish-grind lines 42 are the result of a finish grinding operation performed on the PCD cutting insert so as to achieve specified dimensions. In the finish grinding operation the PCD cutting insert has an orientation with respect to a very fine grit diamond grinding wheel used to perform the finish grinding operation so that impingement of the wheel on the PCD cutting insert results in leaving finish-grind lines 42 which are generally parallel to the cutting edges 34 of the PCD cutting insert 10. More specifically, there is used a peripheral grinding machine with the grinding surface (very fine grit) rotating parallel to the cutting edge and impinging on the flank surface. In FIG. 1 these finish-grind lines 42 are illustrated in an exaggerated fashion so as to clearly show the direction (i.e., generally parallel to the cutting edges) in which these lines lay.

The finish-grind lines 42 create microscopic serrations which after grinding remain in the flank surfaces of the PCD cutting insert 10; however, because the finish-grind lines 42 are parallel to the cutting edges 34, the cutting edges 34 are essentially free of any serrations therein. This is in contrast to the conventional PCD cutting insert (of FIG. 5) wherein the cutting edges contain serrations caused by finish-grinding in a direction perpendicular to the cutting edges. Thus, the PCD cutting insert 10 of FIG. 1, even in the absence of polishing the flank surfaces of the PCD blank 20, still should produce a workpiece with a surface finish better than the conventional PCD cutting insert since the cutting edges 34 of the PCD cutting insert 10 do not contain any serrations. It is expected that the PCD cutting insert 10 of FIG. 1 should produce a surface finish on a workpiece of between about 30 microinches, $R_a$, to about 50 microinches, $R_a$.

Figure 5:
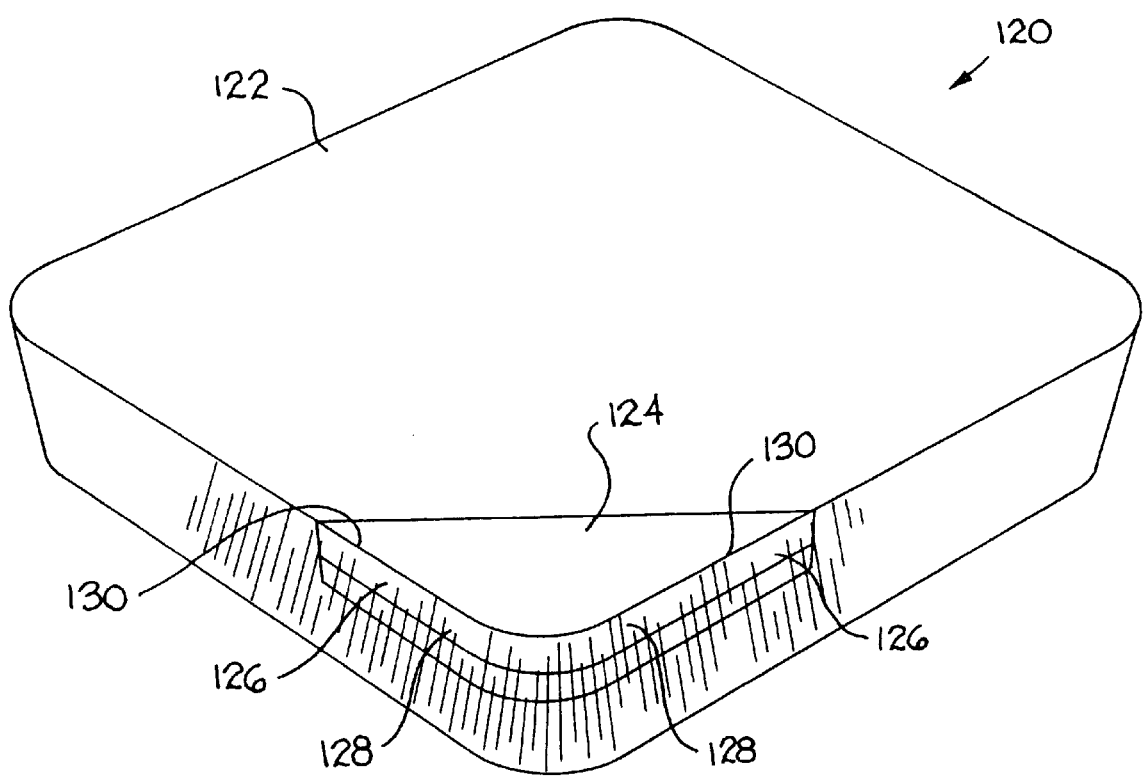
FIG. 5 is an isometric view of a prior art PCD cutting insert wherein the finish-grind lines are perpendicular to the cutting edge of the PCD cutting insert.

This is in contrast to the conventional PCD cutting insert of FIG. 5 which produces a workpiece surface finish of between 40 microinches, Rat and 70 microinches, $R_a$ under the following conditions: an aluminum alloy workpiece; a diamond cutting insert of a style SPG422; speed of 2500 surface feet per minute (sfm); feed rate of 0.005 inches per revolution (ipr); and a depth of cut of 0.025 inches.

In regard to the conventional PCD cutting insert, FIG. 5 depicts a conventional (prior art) PCD cutting insert, generally designated as 120, which comprises a substrate 122 and a PCD blank 124. PCD cutting insert 120 presents finish-grind lines 126 in the flank surface 128 of the PCD blank 124 that are perpendicular (i.e., normal) to the cutting edges 128 of the PCD cutting insert 120. These perpendicular finish-grind lines 126 create serrations in the cutting edge 130 of the PCD cutting insert 120. As mentioned above, the presence of these serrations in the cutting edge are detrimental to producing an optimal workpiece surface finish.

Figure 2:
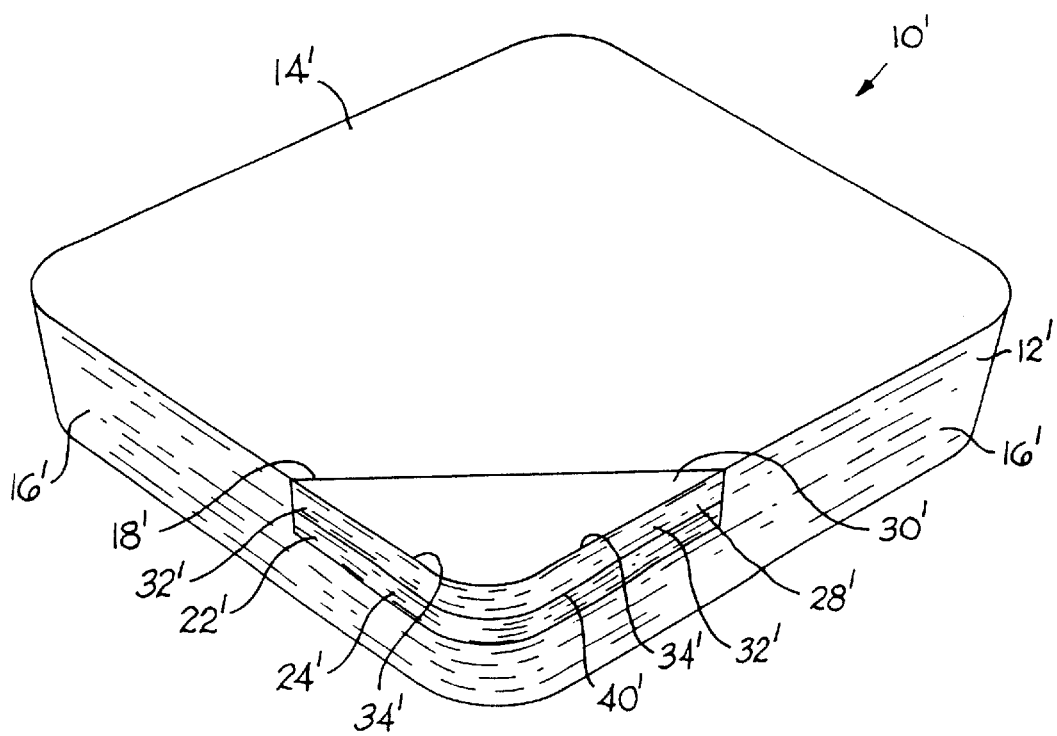
FIG. 2 is an isometric view of a PCD cutting insert like that shown in FIG. 1 wherein the flank surfaces of the PCD blank have been polished to a mirror finish.

In order to produce a PCD cutting insert 10', like that illustrated in FIG. 2, which provides even a smoother workpiece surface finish, one must remove these serrations, which are generally parallel to the cutting edge, from the flank surfaces 32' of the diamond layer 28'. In order to accomplish this task, the flank surfaces 32' of the diamond layer 28' are polished until these flank surfaces 32' obtain a mirror finish, i.e., a surface roughness of less than five microinches (μinches), $R_a$. It is easier to polish out the finish-grind lines (and serrations) which are parallel to the cutting edges than to polish out finish-grind lines (and serrations) that are perpendicular to the cutting edges. It should be appreciated that the flank surfaces could also be buffed. It is expected that the PCD cutting insert 10' in the condition shown by FIG. 2 wherein the flank surfaces have a surface roughness of less than five microinches, $R_a$, would produce a surface finish on a workpiece of between about 25 microinches, $R_a$, to about 35 microinches, $R_a$. Because of the great similarity between the PCD cutting insert 10 of FIG. 1 and the PCD cutting insert 10' of FIG. 2, for elements that are common between these two PCD cutting inserts (10 and 10') the reference numerals are the same, except that the reference numerals in FIG. 2 are primed while those in FIG. 1 are not primed.

The above-recited theoretical workpiece surface roughnesses for workpieces produced from the PCD cutting insert 10' and the PCD cutting insert 10 can be calculated according to the following formula as a function of feed rate, inches per revolution, and the nose radius of the tool:

$$Ra=0.0321\times(\text{feed rate})*2/\text{Nose radius}$$

wherein all of the units are in inches.

Figure 3:
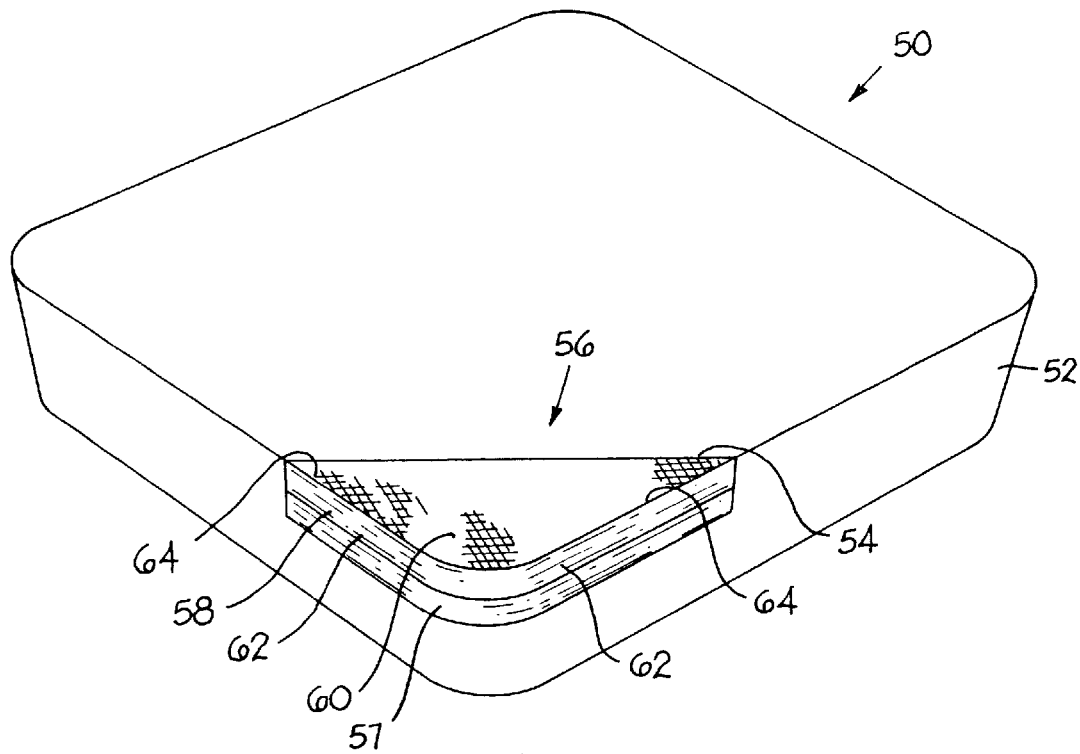
FIG. 3 is an isometric view of a PCD cutting insert like that shown in FIG. 2 wherein the rake surface of the PCD blank has been treated so as to exhibit a surface roughness (illustrated by cross-hatching) sufficient to provide for chip control and the flank surfaces of the PCD blank have been polished to a mirror finish.

Referring to FIG. 3, there is shown a PCD cutting insert generally designated as 50 which is generally similar to the PCD cutting insert 10' of FIG. 2. The PCD cutting insert 50 includes a substrate 52 which contains a pocket 54. A PCD blank generally designated as 56 is affixed (e.g., brazing) in the pocket 54. The PCD blank 56 has a backing layer 57 which has a diamond layer 58 on the top surface thereof. The diamond layer 58 has a rake surface 60 and flanks surfaces 62 which form cutting edges 64 at the intersections thereof. The difference between PCD cutting insert 50 and PCD cutting insert 10' is that the rake surface 60 of the PCD blank 56 has been treated so as to exhibit a surface roughness along the lines of the surface roughnesses of the rake faces disclosed in any one of U.S. Pat. No. 5,585,176 to Grab et al., U.S. Pat. No. 5,648,119 to Grab et al., U.S. Pat. No. 5,709,907 to Battaglia et al., and U.S. Pat. No. 5,722,803 to Battaglia et al. Although the specific ranges may vary, these patents disclose that a range of surface roughnesses in order to achieve chip control wherein the broader range is between 15 microinches, $R_a$, and 125 microinches, $R_a$. Other ranges comprise between 25 and 125 microinches, $R_a$, and between 40 and 80 microinches, $R_a$. The rake surface 60 of the PCD blank 56 thus presents a surface roughness within any one of the above ranges so as to provide for microscopic chip control whereby the material removed from the workpiece is broken into small segments thereby eliminating the formation of long coils (i.e., "birds nests") of material. The treatment used to roughen the rake surface 60 of the PCD blank 56 may be accomplished by any one of the following procedures: plasma etching, laser blading, or ion milling.

It is very apparent that by grinding a PCD cutting insert in a direction so that the finish-grind lines are parallel to the cutting edges and polishing the flank surfaces of the PCD blank, as well as providing for a roughened rake surface of the PCD blank, there is provided a PCD cutting insert which provides microscopic chip control (used with or without a structural or mechanical chip breaker) and also provides workpiece finishes very near (or at) the theoretical values predicted on the basis of tool geometry and the feed rate employed in the cutting operation per the formula set forth herein.

Figure 4:
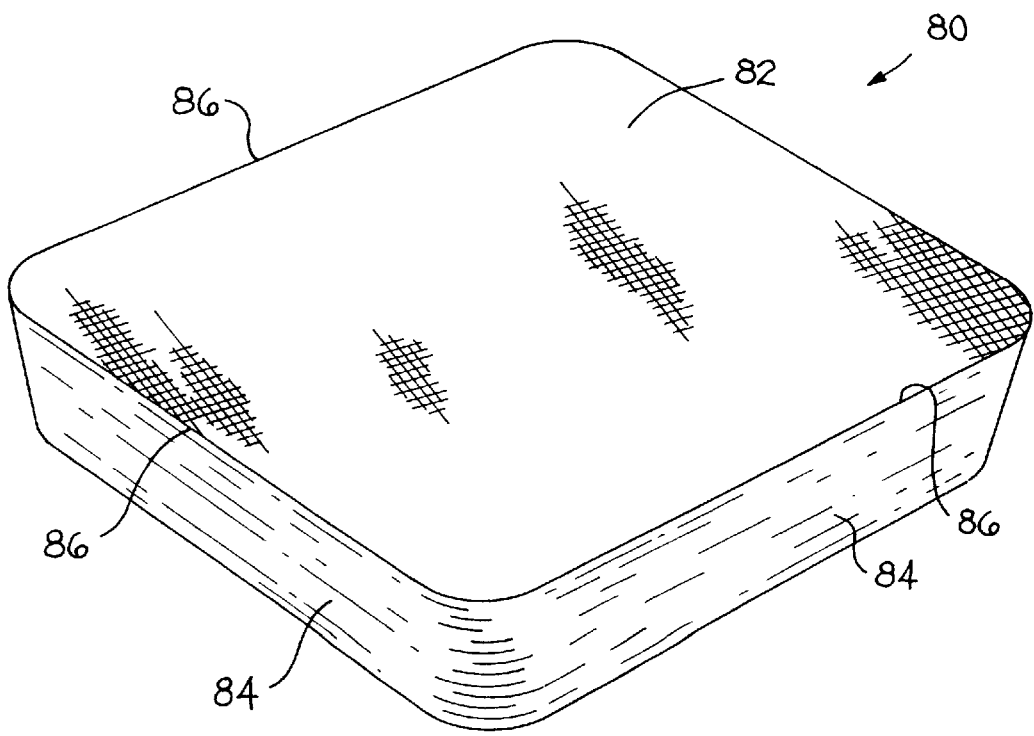
FIG. 4 is an isometric view of a diamond coated cutting insert wherein the rake surface is roughened (as shown by cross-hatching) and the flank surfaces have been polished to a mirror finish.

Referring to FIG. 4, there is illustrated a diamond coated cutting insert generally designated as 80. Cutting insert 80 has a substrate which preferably is a tungsten carbide-based (greater than 50 weight percent tungsten carbide) cemented carbide with a metallic binder (which is preferably cobalt or a cobalt alloy). Other details about the composition and nature of the substrate are found in U.S. Pat. No. 5,585,176 to Grab et al.

The substrate has a rake surface and a flank surface. The substrate is coated with a diamond coating. The diamond coated cutting insert 80 has a rake surface 82 and flank surfaces 84. The rake surface 82 intersects with the flank surfaces 84 to form cutting edges 86 wherein the cutting edges 86 may be in a sharp, honed, or chamfered, or chamfered and honed condition, depending upon the specific application requirements.

When the substrate is processed according to the teachings of either one of the Grab et al. patents or either one of the Battaglia et al. patents the rake surface will exhibit a specified surface roughness. This surface roughness is within the ranges set forth in these patents. Typically, the surface roughness should be equal to or greater than 15 microinches, $R_a$ (and more preferably greater than thirty microinches, $R_a$) so as to provide for satisfactory microscopic chip control. The rake surface 82 of the cutting insert 80 will also exhibit a surface roughness within the above ranges. The flank surfaces 84 of the cutting insert 80 have been polished so that they has a mirror finish (less than 5 microinches, $R_a$)

Referring to Table IV of U.S. Pat. No. 5,585,176 to Grab et al., it is expected that in cutting an aluminum-silicon alloy under the similar conditions for tests set forth in Table IV of U.S. Pat. No. 5,585,176 using a diamond coated cutting insert with the diamond surface in the "as-deposited" condition the workpiece surface finish will range between 51 microinches, $R_a$, and 179 microinches, $R_a$. Still according to the results set forth in Table IV of U.S. Pat. No. 5,585,176, it is expected that buffing the flank surfaces of the diamond coated cutting insert will result in workpiece surface finish between 35 microinches, $R_a$, and 75 microinches, $R_a$. It is also expected that polishing the flank surfaces of the diamond coated cutting insert in the cutting zone of the cutting insert to a surface roughness of less than 5 microinches, $R_a$, which is the case for the cutting insert of FIG. 5, will result in workpiece surface finishes ranging between 20 microinches, $R_a$, and 25 microinches, $R_a$.

Although the specific embodiments refer to a PCD cutting insert and a diamond coated cutting insert, it should be appreciated that the invention has application to coated carbide cutting inserts, ceramic cutting inserts and cermet cutting inserts. In this regard, the rake surface of the cutting insert would present a surface roughness sufficient to provide for chip control and the flank surface(s) would exhibit a surface roughness (e.g., less than 5 microinches, $R_a$) whereby the workpiece surface finish would approach (or possibly reach) the theoretical value.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A polycrystalline diamond cutting insert comprising:
   a substrate containing a pocket;
   a polycrystalline diamond blank affixed in the pocket, and the polycrystalline blank comprising:

a rake surface and a flank surface wherein the rake surface and the flank surface intersect to form a cutting edge; and the flank surface presenting finish-grind lines lying in a direction generally parallel to the direction of the cutting edge.

2. The polycrystalline diamond cutting insert according to claim 1 wherein the cutting edge contains substantially no serrations resulting from the presence of the finish-grind lines.

3. The polycrystalline diamond cutting insert of claim 2 wherein the cutting edge contains no serrations resulting from the presence of finish-grind lines.

4. The polycrsytalline diamond cutting insert according to claim 1 wherein the finish-grind lines in the flank surface being polished out so that the flank surface presenting a surface roughness of less than five microinches, $R_a$.

5. The polycrystalline diamond cutting insert according to claim 4 wherein the rake surface has a surface roughness greater than about 15 microinches, $R_a$.

6. The polycrystalline diamond cutting insert according to claim 1 wherein the polycrystalline blank comprises a plurality of the flank surfaces, and the rake surface intersects with the flank surfaces to form a plurality of the cutting edges.

7. The polycrystalline diamond cutting insert according to claim 6 wherein at least two of the flank surfaces present finish-grind lines which lie in a direction generally parallel to the direction of the corresponding cutting edge.

8. The polycrystalline diamond cutting insert according to claim 7 wherein each one of the cutting edges contains substantially no serrations.

9. The polycrystalline diamond cutting insert according to claim 1 wherein the rake surface has a surface roughness greater than about 15 microinches, $R_a$.

10. A polycrystalline diamond blank for use in conjunction with a substrate wherein the blank comprises:

a rake surface and a flank surface wherein the rake surface and the flank surface intersect to form a cutting edge; and the flank surface presenting finish-grind lines lying in a direction generally parallel to the direction of the cutting edge.

11. The polycrystalline diamond blank according to claim 10 wherein the cutting edge contains substantially no serrations resulting from the presence of the finish-grind lines.

12. The polycrystalline diamond blank according to claim 10 wherein the finish-grind lines in the flank surface being polished out so that the flank surface presenting a surface roughness of less than five microinches, $R_a$.

13. The polycrystalline diamond blank according to claim 10 wherein the rake surface has a surface roughness of greater than 15 microinches, $R_a$.

14. A diamond coated cutting insert comprising:

a rake surface having a surface roughness of greater than about 15 microinches, $R_a$;

a flank surface;

a cutting edge at the intersection of the rake surface and the flank surface; and the flank surface initially presenting finish-grind lines lying in a direction generally parallel to the direction of the cutting edge wherein the finish-grind lines being polished out so that the flank surface having a surface roughness of less than five microinches, $R_a$.

15. The diamond coated cutting insert according to claim 14 wherein the surface roughness of the rake surface is greater than 35 microinches, $R_a$.

16. A method of making a PCD cutting insert comprising the steps of:

providing a substrate containing a pocket;

providing a PCD blank having a diamond layer and a backing layer wherein the diamond layer has a rake surface and a flank surface which intersect to form a cutting edge;

affixing the PCD blank in the pocket of the substrate; and finish-grinding the flank surface of the diamond layer so that the finish-grind lines are generally parallel to the cutting edge whereby there are substantially no serrations in the cutting edge.

17. The method according to claim 16 wherein the finish-grinding step results in the cutting edge having no serrations therein.

18. The method according to claim 16 further including the step of polishing the flank surface of the diamond layer so that the surface roughness of the flank surface of the diamond layer is less than five microinches, $R_a$.

19. The method of claim 18 further including the step of roughening the rake surface of the diamond layer so that the surface roughness of the rake surface of the diamond layer is greater than 15 microinches, $R_a$.

20. The method of claim 19 wherein the roughening step comprising one or more of the following procedures selected from the group consisting of ion milling, laser blading or plasma etching.

21. The method of claim 16 further including the step of roughening the rake surface of the diamond layer so that the surface roughness of the rake surface of the diamond layer is greater than 15 microinches, $R_a$.

22. A method making a diamond coated cutting tool comprising the steps of:

providing a substrate having a rake surface having a surface roughness of greater than 15 microinches, $R_a$, and a flank surface wherein the rake surface and the flank surface intersect to form a cutting edge;

coating the substrate with a diamond layer so that the diamond layer is on at least the rake surface and the flank surface;

finish-grinding the diamond layer on the flank surface so that the finish grind-lines are generally parallel to the cutting edge whereby there are substantially no serrations in the cutting edge; and then polishing the diamond layer on the flank surface that has been finish-ground so that the diamond layer on the flank surface has a surface roughness of less than five microinches, $R_a$.

23. The method according to claim 22 wherein the surface roughness of the rake surface is greater than 35 microinches, $R_a$.

* * * * *